United States Patent
Adler

[15] 3,637,262
[45] Jan. 25, 1972

[54] PNEUMATIC DISCHARGE ARRANGEMENT

[72] Inventor: Franklin P. Adler, Michigan City, Ind.
[73] Assignee: Pullman Transport Leasing Company, Chicago, Ill.
[22] Filed: Dec. 31, 1969
[21] Appl. No.: 889,497

[52] U.S. Cl. ................................................. 302/52
[51] Int. Cl. ............................................. B65g 53/40
[58] Field of Search ............... 302/17, 52, 53, 57; 222/193, 222/148

[56] References Cited

UNITED STATES PATENTS

| 2,647,802 | 8/1953 | Hornbrock | 302/52 |
| 3,174,807 | 3/1965 | Adler | 302/52 |

Primary Examiner—Joseph Wegbreit
Assistant Examiner—H. S. Lane
Attorney—Hilmond O. Vogel and Wayne Morris Russell

[57] ABSTRACT

A discharge arrangement comprises a hopper having sloping sidewalls provided with a discharge opening communicating with a tube adapted to be connected to a pneumatic conveying system. The discharge opening is provided with a valve member which cooperates with a movable valve element to regulate the discharge of material. The valve is movable horizontally and includes opposed cutting edges which cooperate with the valve element in cutting through the material during closing of the valve. The valve element is movable upwardly free of the valve so that all the edges of the valve and valve element are free and clear and can be cleaned during a cleanout operation.

17 Claims, 5 Drawing Figures

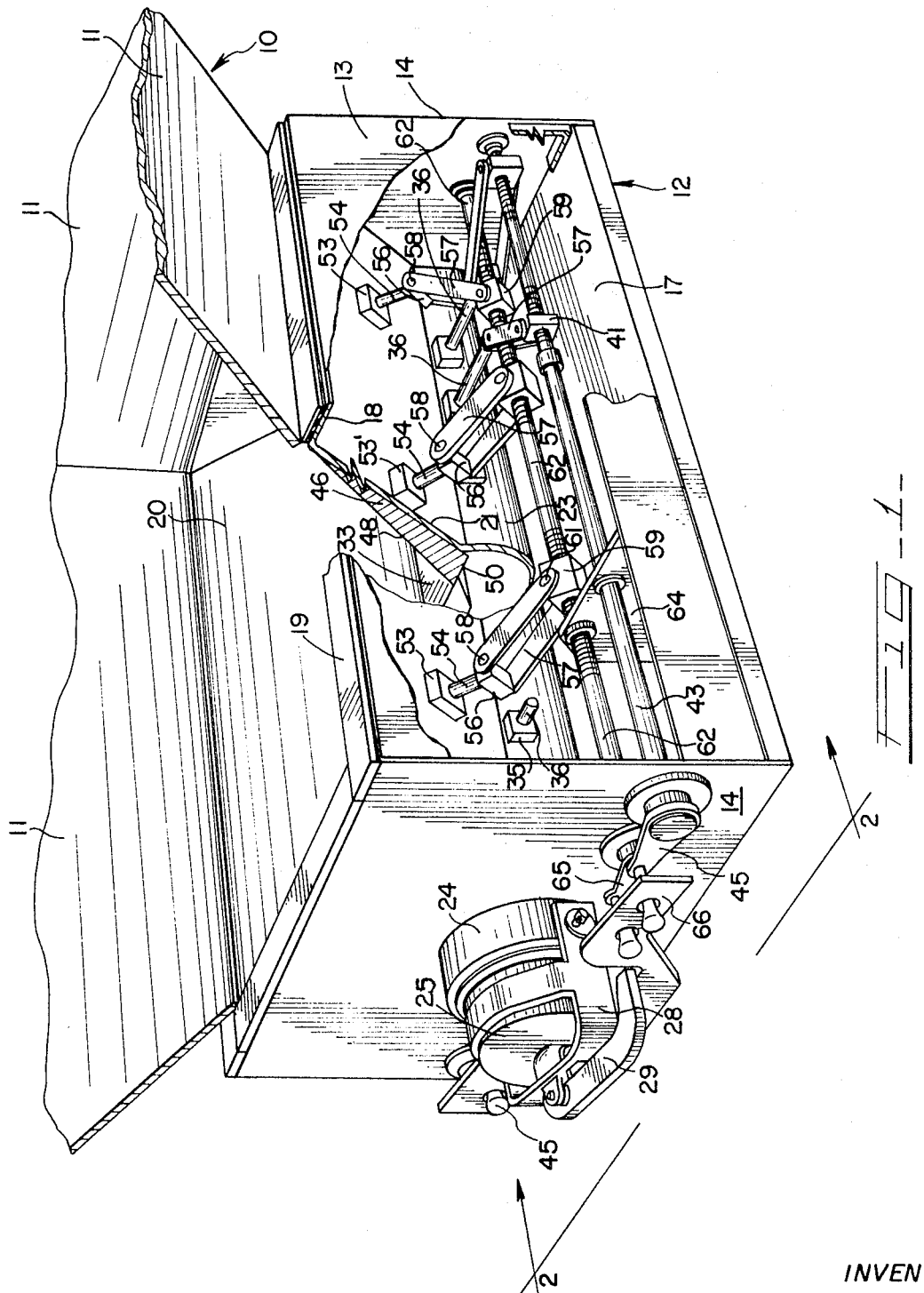

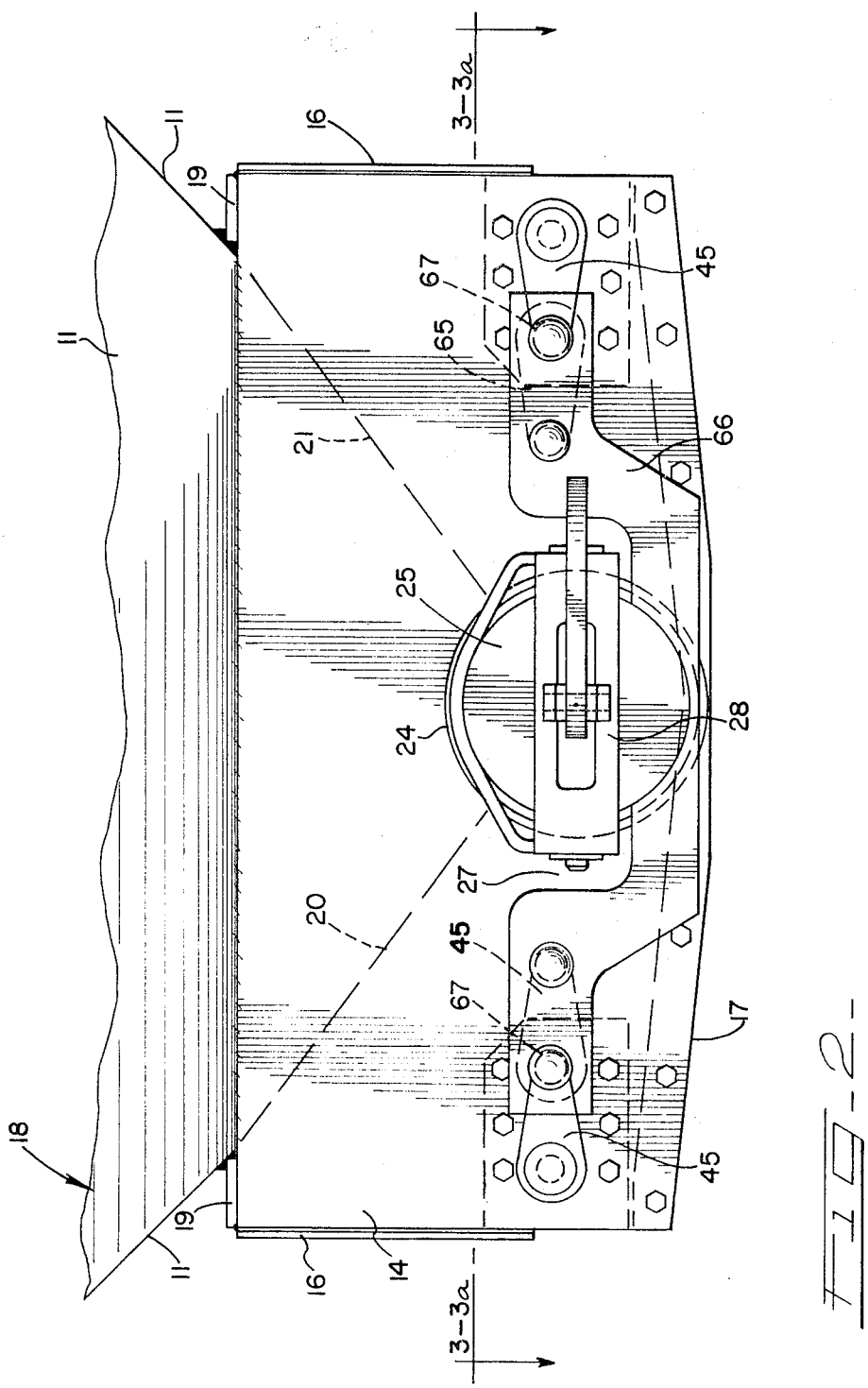

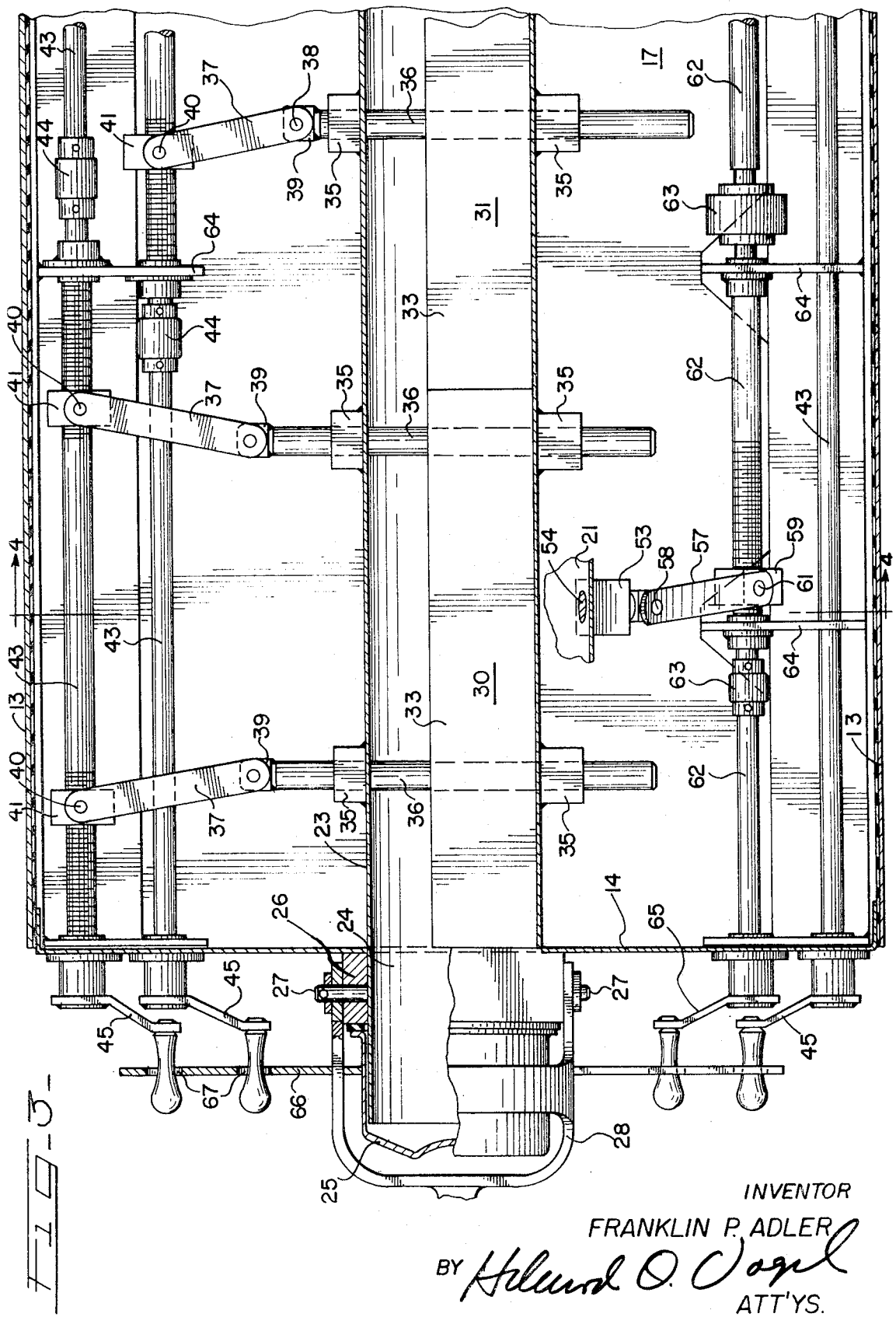

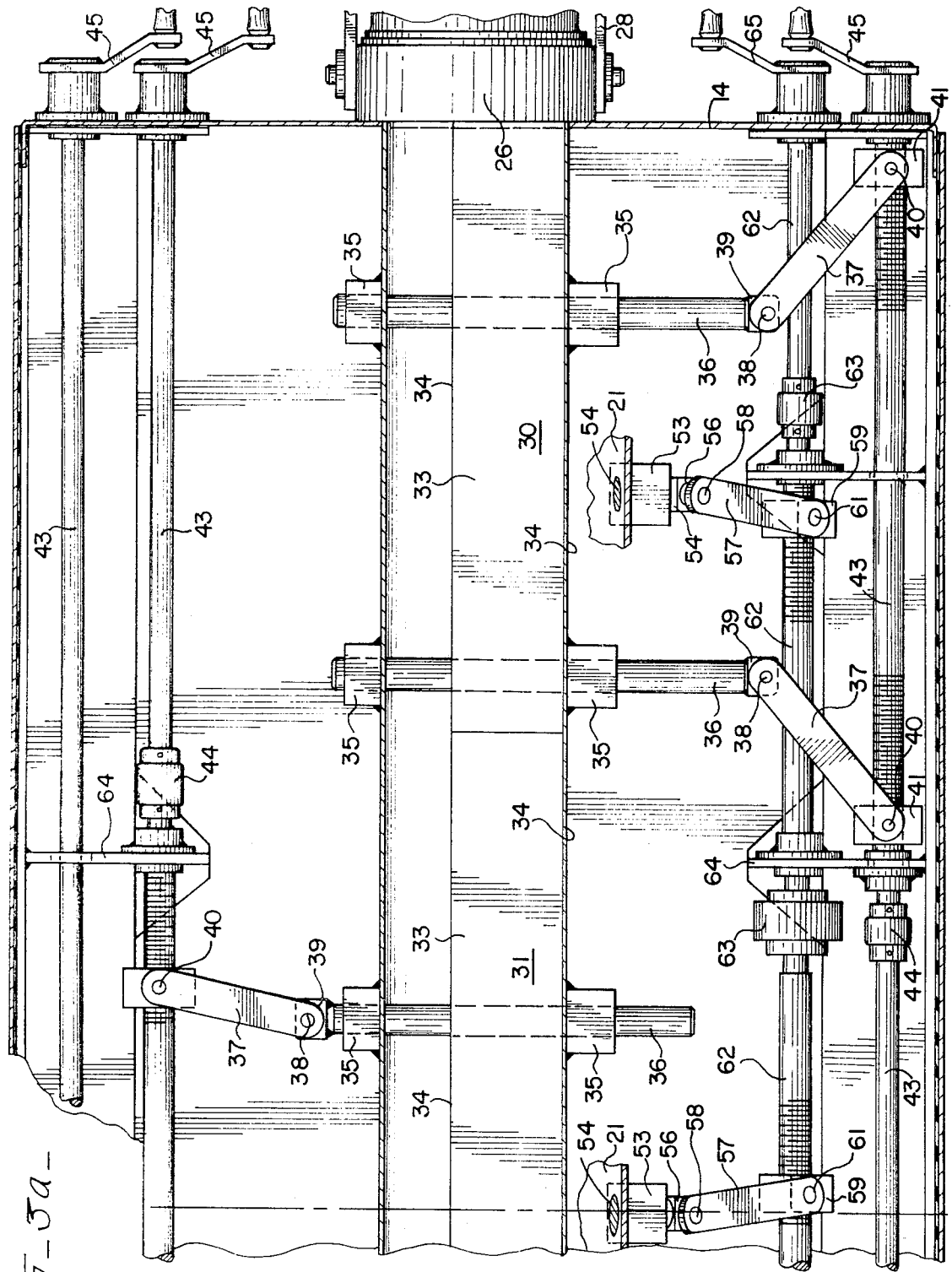

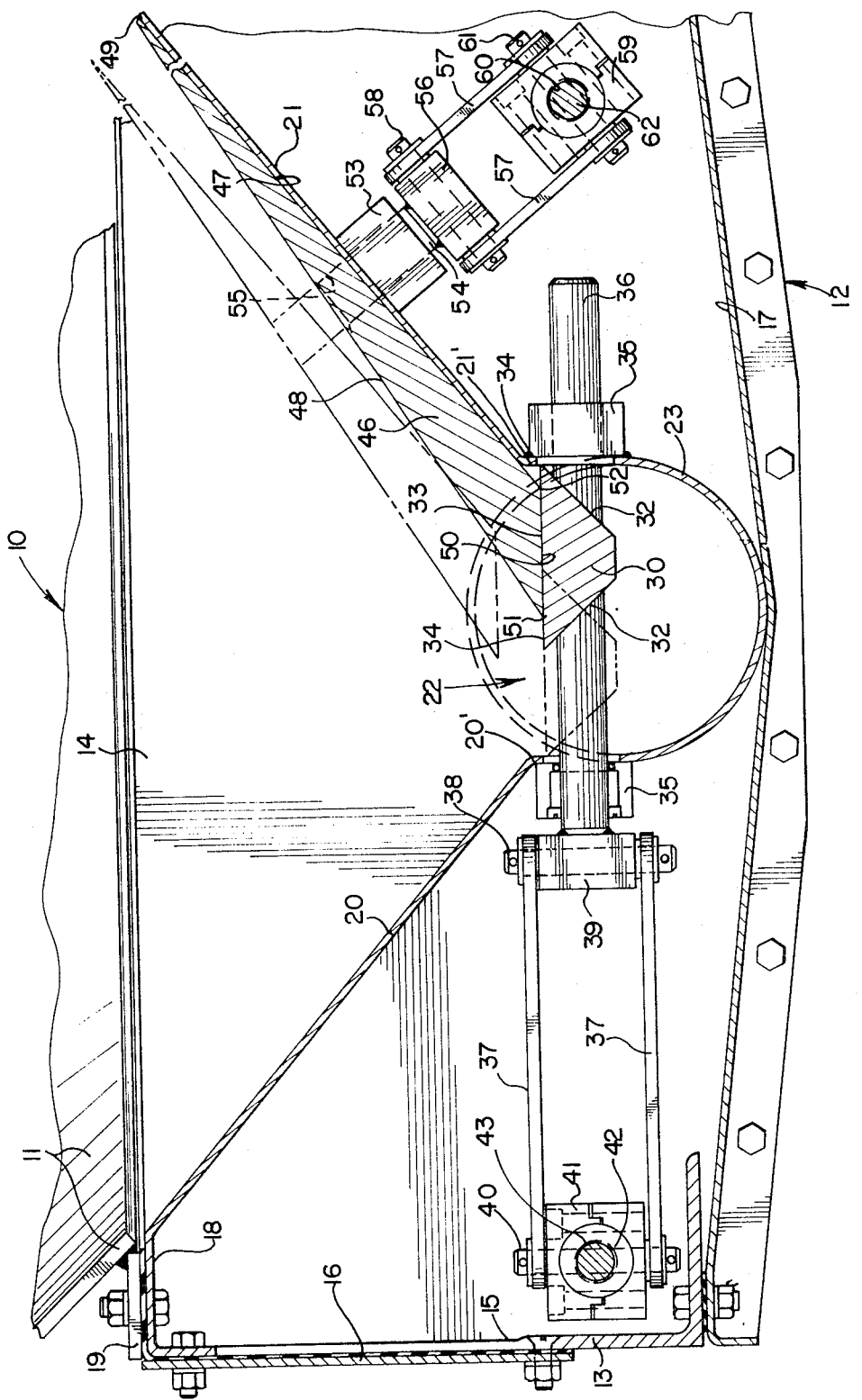

3,637,262

PNEUMATIC DISCHARGE ARRANGEMENT

SUMMARY

The prime object of this invention is to provide an improved pneumatic discharge arrangement for hoppers, which may be carried on a railway hopper car or may be stationary, by the utilization of a valve arrangement particularly suited for regulating the flow of granular or comminuted materials through a discharge tube suitably connected to a pneumatic conveying system which by the application of the pressure differential conveys the material from the hopper to storage bins and the like.

The pneumatic discharge arrangement comprises essentially a boxlike structure which is supported beneath a hopper containing particulate or pelletized material. The structure includes sloping walls having at their lower ends a discharge opening which discharges materials from the hopper into a transversely extending tube that may be suitably connected to a stationary pneumatic conveying system. The boxlike structure includes a valve arrangement which may be actuated from opposite sides of a railway car, or stationary hopper with the valve arrangement comprising a plurality of horizontally movable valve elements having at opposite sides walls which converge towards each other to provide sharp cutting edges. The valve arrangement is suitably actuated by manually operated hand levers to move simultaneously across the discharge opening in cooperative engagement with a valve element which is engaged by the upper surface of each of the valves. The valve element extends partially across the discharge opening and with the manipulation of the movable valves, material may be metered or discharged in desired quantities through the discharge opening through the pneumatic tube for ultimate discharge. The valve element cooperates in the cutting action of the valve members which are provided with sharp cutting edges so that during closure of the valve the edges cut through the material and thus facilitate the ease and speed of the closing operation when it is sought to discharge only a limited quantity. The valve element is also suitably connected to actuating mechanism which permits the valve element to be raised free and clear of sloping walls and completely free of the valve member so that both the valve member and valve element have all of their edges exposed and are out of engagement with one another to permit washing out or cleaning of the discharge opening and valve and valve element.

BRIEF DESCRIPTION OF THE DRAWINGS

FIG. 1 is a perspective view, partially in section, of a pneumatic discharge arrangement including a boxlike structure disclosing valve and valve member actuating members;

FIG. 2 is an end elevational view taken substantially along the line 2—2 of FIG. 1;

FIG. 3 is a cross-sectional view taken along the line 3—3 of FIG. 2 showing one-half of a pneumatic discharge arrangement;

FIG. 3a is a view taken substantially along the line 3a—3a of FIG. 2 showing the other half of a pneumatic discharge arrangement; and FIG. 4 is a cross-sectional view taken substantially along the line 4—4 of FIG. 3.

DETAILED DESCRIPTION

Referring now to FIGS. 1, 2 and 4, a hopper structure is designated by the reference character 10 and includes a plurality of sloping hopper walls 11. The hopper walls 11 slope downwardly toward one another and are provided at their lower ends with a pneumatic discharge arrangement generally designated by the reference character 12. The hopper structure 10 may be supported on a suitable vehicle such as a railway car or the invention may be utilized in connection with a stationary hopper structure from which material is discharged through a pneumatic conveying system to its ultimate point of destination.

The discharge arrangement 12 comprises a boxlike structure including vertical walls 13 suitably connected to end walls 14. The end walls 14 are provided with access openings 15 through which access may be had for servicing valve actuating means to be hereinafter described. Suitable cover plates 16 are provided over the openings 15. The structure 13 also includes a flat substantially horizontal bottom wall 17 and upper wall portions 18 are suitably connected to flanges 19 rigidly connected to the sloping hopper walls 11 for suitably connecting the boxlike structure 13 beneath the hopper structure 10.

The boxlike structure 13 comprises a pair of sloping walls 20 and 21 converging towards one another to provide at their lower ends a discharge opening 22 defined respectively by vertical wall portions 20' and 21'. This discharge opening 22 is in communication with a horizontally extending pneumatic tube 23. The tube 23, as best shown in FIGS. 3 and 3a, projects outwardly of the end walls 14 and includes a pair of opposed end portions 24 which may be closed by conventional closure caps 25. Each of the closure caps 25 are placed in sealing relation over the end portions 24 and against a closure ring 26 supported on the walls 14 and extending about the end portions 24. Pivot pins 27 project outwardly from the ring 26 and pivotally support a bail 28 having connected thereto a suitable actuating camming mechanism 29 which releasably clamps each of the caps 25 in the position indicated in FIGS. 3 and 3a.

The structure 13 supports a plurality of end valve members 30 and an intermediate valve member 31 within said discharge opening 22 along the length of the discharge arrangement 12. This is best disclosed in FIGS. 3 and 3a which figures when positioned in side-by-side relationship substantially disclose the full length of the discharge arrangement. As best disclosed in FIG. 4, each valve member 30 is provided with a pair of downwardly converging sidewalls 32 terminating in an upper wall 33. The upper surface 33 and converging surfaces 32 provide on the valve member 30 opposed sharp cutting edges 34.

As best shown in FIG. 4, the sloping walls 20 and 21 respectively are provided at their lower ends with vertical wall portions 20' and 21' which support thereon in horizontally spaced relation guide and seal assemblies 35. The guide and seal assemblies 35 slidingly support a plurality of transversely extending actuating rods 36 which are connected at one of their ends to parallel links 37 by means of pivot pins 38. The pivot pins 38 are pivotally connected to the parallel links 37 and are rigidly secured to swivel blocks 39 secured to the transverse actuating rods 36. The other ends of the parallel links 37 are pivotally connected to pivot pins 40 rigidly secured to thrust blocks 41 having, as best shown in FIG. 4, threaded bores 42.

As best shown in FIG. 3, two longitudinally extending and parallel drive screws 43 are pivotally supported on one side of the boxlike structure 13. The drive screws 43 extend the full length of the structure 13 and are interconnected by means of connectors 44 with said screws 43 projecting outwardly from opposed walls 14 and having connected thereto for suitable rotation hand levers 45. A similar drive screw 43 is connected to the other side of the boxlike structure 13 as shown in FIG. 3, the screw 43 also extending the length of the structure 13 and having connected thereto at opposite ends thereof hand levers 45. Referring to FIG. 3, the drive screw 43, which is at the top of the drawing disclosed, actuates two of the thrust rods 36 which are connected to one of the end valves 30. The intermediate valve 31 is actuated by the drive screw 43 disposed in laterally spaced relation with respect to the aforementioned drive screw 43. As best shown in FIG. 3a, the lower drive screw 43 actuates the links 37 which in turn move the other end valve member 30.

Actuation of the parallel links 37 is provided by the drive screws 43 which move the thrust blocks 41 longitudinally thus causing the parallel links 37 to slide rods 36 through guide and seal members 35 thereby effecting lateral or transverse movement of the valve members 30 and 31 thereby metering the discharge of material through the discharge opening 22 into the pneumatic tube 23.

The valves 30 and 31 are shown in the open position in FIG. 4 and the closed position of the valves 30 is indicated in broken lines. In closed position the valves 30 and 31 block the discharge opening 22 against the escape of material. The valves 30 and 31 cooperate with a valve element or deflector plate 46 longitudinally coextensive with said valves 30 and 31. The valve element 46 comprises a lower wall or surface 47 positioned in contiguous or engaging relation with respect to the sloping wall 21. Each valve element 46 also includes an upper sloping wall or surface 48 which directs material within the hopper to the discharge opening 22 by virtue of its sloping relation. The surface 47 and 48 terminate in a feather edge 49. The valve element 46 comprises, as shown in FIG. 4, bottom flat surface or wall 50 with a feather or leading edge 51 at one end, and at its other end with a trailing edge 52. The surface 50 is slidingly engaged by the upper surface 33 of each valve 30, 31 in sliding relation during laterally positioned movement of the valves 30, 31.

As best shown in FIGS. 1, 3 and 3a, a plurality of guide blocks 53 are rigidly connected to the outer side of the wall 21 and thrust rods 54 are slidingly guided therein. Each rod 54 is rigidly secured within sockets 55 disposed longitudinally along said valve element 46. Swivel blocks 56 are connected to ends of the rods 54 and are pivotally connected to parallel links 57 by means of pivot pins 58 rigidly secured to said swivel blocks. The other ends of the parallel links 57 are pivotally connected to thrust blocks 59 having threaded bores 60, as best shown in FIG. 4, by means of pivot pins 61.

A series of drive screws 62 in longitudinal alignment as shown in FIGS. 3 and 3a, are interconnected for rotation by means of connectors 63 and are rotatably supported on gussets 64. The gussets 64 also suitably support drive screws 43 on the boxlike structure 13. Hand levers 65 connected to ends of the drive screws 62 are provided on opposite sides of the walls 14, as best shown in FIGS. 1 and 2, for ready access by the operator. As best shown in FIG. 2, hand levers 65 are positioned in locked relation by means of a lock plate 66 having openings 67 in which the hand levers 65 are retained when the caps 25 are in the closed position shown in FIG. 2. The lock plate 66 is suitably welded to the cap 25 so that in the position indicated in FIG. 2, none of the hand levers 45 or 65 may be rotated from the closed position.

THE OPERATION

The discharge arrangement 12 may be disposed underneath each hopper carried by a railway hopper car and in such a construction and arrangement may be operated from opposite sides of the car by virtue of the drive screws 43 and 62 which are provided at opposite ends with the hand levers indicated. As shown in FIG. 2, valve members 30 and 31 are in the closed or dotted line position shown in FIG. 4. When it is decided to actuate the valve members 30, 31 they may be successively opened by rotation of the levers 45 wherein they will be moved to the open position shown in FIGS. 3 and 3a. This of course is accomplished when the hopper car reaches its destination and the caps 25 are removed from the open ends 24 of the discharge tube 23. Since each of the valves 30, 31 may be actuated independently, full control for unloading is provided so that the material in the hopper 10 may be unloaded into the discharge or pneumatic tube gradually or in the desired quantities so that adequate and fast conveyance of the material may be accomplished.

The sharp cutting edge 34 is particularly effective in the closing operation of the valves 30, 31 to cut through the material and thus permit the fast operation of the valves to their closed position. Similarily in opening, the cutting edges 34 are thus effective. This is particularly true when the car contains particulate or comminuted materials such as pellets, etc., where such cutting action is necessary to effectuate quick action of the valves. In the regulating or operating position the valve element or deflector plate 46 is in the position shown in FIG. 4 and material slides down the upper surface 48 toward the discharge opening 22. The sharp leading edge 51 of the valve element 46 permits ease of operation of the valves 30, 31 to their open positions since material does not become clogged between the sliding surfaces 33 and 50.

After material has been totally discharged from the hoppers 10, it is desired that the interior of the hoppers as well as the valve element 46 and valves 30, 31 are cleared of any material. For this purpose the hopper car may be cleansed or washed out with water or air and in order to achieve effective cleansing, prior to cleanout, the hand levers 65 are rotated which in turn causes rotation of the drive screws 62 actuating the parallel links 57 to move the rods 54 through the guides 53 thereupon raising the valve element 46 to the dotted line position indicated in FIG. 4. In this position all of the valves and valve elements are completely cleansed.

It is thus believed that the invention is fully disclosed and fulfills the primary object which is set forth. Changes may be made in the structure which do not depart from the spirit of the invention as disclosed nor the scope thereof as defined in the appended claims.

I claim:

1. A material discharge arrangement for a hopper having a sloping sidewall converging toward a discharge opening;
   a valve mechanism for controlling the discharge of material through said discharge opening from said hopper, including
   a valve element having a relatively flat horizontal bottom surface disposed over a portion of said discharge opening,
   upper and lower sloping walls on said valve element extending respectively from said bottom surface in the same general direction over said sidewall and said lower wall engaging and being supported on said sidewall,
   a valve having an upper flat surface in relative sliding engagement relative to said bottom surface of said valve element,
   said valve having a sealing portion,
   means moving said valve across said discharge opening with said sealing portion controlling the flow of material therethrough,
   said flat upper surface of said valve and said bottom surface being in relative engaging and sliding relation, and
   means moving said valve element upwardly relative to said sloping wall whereby said bottom surface of said valve element and said lower wall thereof are spaced respectively above said upper surface of said valve and said sloping wall.

2. The invention in accordance with claim 1,
   sealing portion having a cutting edge.

3. The invention in accordance with claim 2,
   said valve having opposite sidewalls converging from said flat upper surface.

4. A valve mechanism for controlling the flow of material through a discharge opening disposed adjacent the lower end of a sloping hopper wall, comprising:
   a valve positioned for reciprocating movement across said discharge opening,
   said valve having an edge portion adapted to meter the flow of material through said opening,
   a flat upper surface on said valve,
   a valve element positioned above said valve, and having a bottom flat surface disposed within said discharge opening which is slidingly engaged by said upper surface during reciprocation of said valve,
   means including a rotatable actuating shaft connected to said valve for reciprocating the same, and
   means including another rotatable shaft moving said valve element in a direction providing for disengagement of said upper and bottom surfaces.

5. The invention according to claim 4,
   said valve element having a first wall sloping toward said discharge opening and being supported on said hopper wall, said valve element during said directional movement being moved vertically relative to and out of sliding engagement with said valve and out of supported relation on said hopper wall.

6. The invention in accordance with claim 5,
said valve element including a bottom surface below said first wall and in said vertically moved position said upper surface of said valve and said bottom flat surface of said valve element being disengaged, and said bottom surface of said valve element being supported out of engagement with said hopper wall whereby material may flow freely around said valve element and to said discharge opening.

7. The invention in accordance with claim 6,
said discharge opening communicating with a pneumatic discharge tube disposed below said opening,
said tube having means adapted for connection to a pressure conveying system.

8. The invention in accordance with claim 7,
said means for reciprocating said valve comprising:
a rod extending transversely through said tube in relative sliding relation and being connected to said valve,
a rotatable actuating member supported by housing structure connected to said tube, and
link means pivotally connected to said actuating member and said rod whereby upon rotation of said actuating member said rod and valve are moved.

9. The invention in accordance with claim 8,
said means including said rotatable shaft for moving said valve element comprising:
a rod connected to said valve element and slidably supported relative to said hopper wall,
a second actuating member rotatably mounted on said housing structure, and
means connected to said second actuating member and to said valve element for actuating the same.

10. A discharge hopper including a housing including sloping walls converging to a discharge opening, a pressure differential discharge tube communicating with said discharge opening, the improvement comprising:
a valve mechanism including a valve member movable transversely within said discharge opening,
said valve member having at least one cutting edge movable from a closed position relative to said discharge opening to an open position,
a deflector plate disposed adjacent said valve member within said discharge opening,
said plate having a bottom surface including an edge defining one side of said discharge opening, and an upper surface deflecting material from said hopper to said opening, and
means on said housing adapted to move said deflector plate from adjacent said valve member to a position wherein material may flow freely about said plate and valve member.

11. A material discharge arrangement for a hopper having a discharge portion and including a pair of sloping sidewalls converging toward a discharge opening;
said discharge portion including a pneumatic discharge tube disposed below said opening,
said tube being adapted for connection to a pressure conveying system,
a valve means positioned for reciprocating movement across said discharge opening and positioned for sliding movement below one of said sloping sidewalls,
said valve means having an edge portion adapted to meter the flow of material through said opening into the discharge tube,
a rotatable operating means connected with said valve means for movement of same,
said operating means accessible from opposite sides of said hopper and rotatable to open and close said valve means.

12. The invention according to claim 11,
one of said sloping sidewalls including a depending lower portion,
said valve edge portion movable into sealing relation to said lower portion to prevent material discharge from said hopper,
said valve edge portion movable away from said lower depending portion to provide metered flow of material from said hopper.

13. The invention according to claim 11,
said sloping sidewalls including bottom portions spaced apart to form said discharge opening,
said valve means reciprocated across said discharge opening below the bottom portions of the sloping sidewalls in sealing relation to said bottom portions to prevent material discharge when the valve means has entered a position below the bottom portions of the sloping sidewalls.

14. The invention according to claim 11,
said valve means including spaced valve members positioned for reciprocating movement across said discharge opening controlling the flow of material therethrough,
rotating shaft operating mechanism connected with the space valve members for independent actuation of said valve members,
said operating mechanism accessible from opposite sides of said hopper and rotatable to open and close said valve members.

15. The invention according to claim 11,
said valve means including a horizontal surface and a sloped surface,
said horizontal and said sloped surfaces forming an edge portion reciprocable into the discharge opening to meter the flow of material through said discharge opening, 16. The invention according to claim 11,
said sloping sidewalls including bottom portions,
said edge portion including an acute angle portion formed at the juncture of an upper surface and a lower surface of the valve means,
said valve means reciprocable across the discharge opening to meter the flow of material through said opening and prevent material flow when said edge portion abuts a lower bottom portion of said sloping wall.

17. A material discharge arrangement for a hopper having a discharge portion and including a pair of sloping sidewalls converging toward a discharge opening;
said discharge portion including pneumatic discharge tube disposed below said opening,
said tube being adapted for connection to a pressure conveying system,
a valve means positioned to meter the flow of material through said discharge opening,
a valve element having a bottom surface disposed over a portion of said discharge opening,
upper and lower sloping walls of said value element extending respectively from said bottom surface in the same general direction over one of said sloping sidewalls and said lower wall engaging and being supported on said sloping sidewall,
means moving said valve element away from said sloping wall thereby to space said lower wall above said sloping sidewall whereby material may flow freely around said valve element and into said discharge opening.

* * * * *